US008713343B2

(12) United States Patent
Sugitachi

(10) Patent No.: US 8,713,343 B2
(45) Date of Patent: Apr. 29, 2014

(54) ELECTRONIC CONTROL APPARATUS

(75) Inventor: Eiji Sugitachi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 453 days.

(21) Appl. No.: 13/194,694

(22) Filed: Jul. 29, 2011

(65) Prior Publication Data

US 2012/0054526 A1 Mar. 1, 2012

(30) Foreign Application Priority Data

Aug. 31, 2010 (JP) .................................. 2010-193824
Jan. 25, 2011 (JP) .................................. 2011-12906

(51) Int. Cl.
*G06F 1/30* (2006.01)

(52) U.S. Cl.
USPC ................ 713/340; 713/300; 714/22; 714/23

(58) Field of Classification Search
USPC ................ 713/300, 340; 714/22, 23
See application file for complete search history.

(56) References Cited

U.S. PATENT DOCUMENTS

| | | | |
|---|---|---|---|
| 4,586,179 A | * | 4/1986 | Sirazi et al. ..................... 714/22 |
| 5,563,799 A | * | 10/1996 | Brehmer et al. .............. 702/186 |
| 5,892,893 A | | 4/1999 | Hanf et al. |
| 2004/0122565 A1 | | 6/2004 | Sakurai et al. |
| 2004/0172233 A1 | | 9/2004 | Ito et al. |
| 2007/0108840 A1 | | 5/2007 | Amada et al. |

FOREIGN PATENT DOCUMENTS

| | | |
|---|---|---|
| JP | A-H05-32142 | 2/1993 |
| JP | A-2008-242701 | 10/2008 |

OTHER PUBLICATIONS

Office Action mailed Jul. 3, 2012 in corresponding JP Application No. 2010-193824 (and English translation).
Office Action mailed Nov. 6, 2012 in corresponding JP Application No. 2010-193824 (and English translation).
Examination Report issued on Sep. 3, 2013 in the corresponding CN application No. 2011 1026 0378.1 (English translation).

* cited by examiner

*Primary Examiner* — Thuan Du
(74) *Attorney, Agent, or Firm* — Posz Law Group, PLC

(57) ABSTRACT

In an electronic control apparatus, a microcomputer stops its operation when a power voltage supplied from a regulator starts to fall. When a low voltage detection circuit detects fall of the power voltage, the microcomputer is reset immediately and a communication start detection circuit is permitted to output a communication start signal. It is also possible to maintain the microcomputer in a wait state until proceeding to a sleep mode, and proceed to a normal operation mode when a power-on start signal is changed to be active in a period of the wait state.

8 Claims, 13 Drawing Sheets

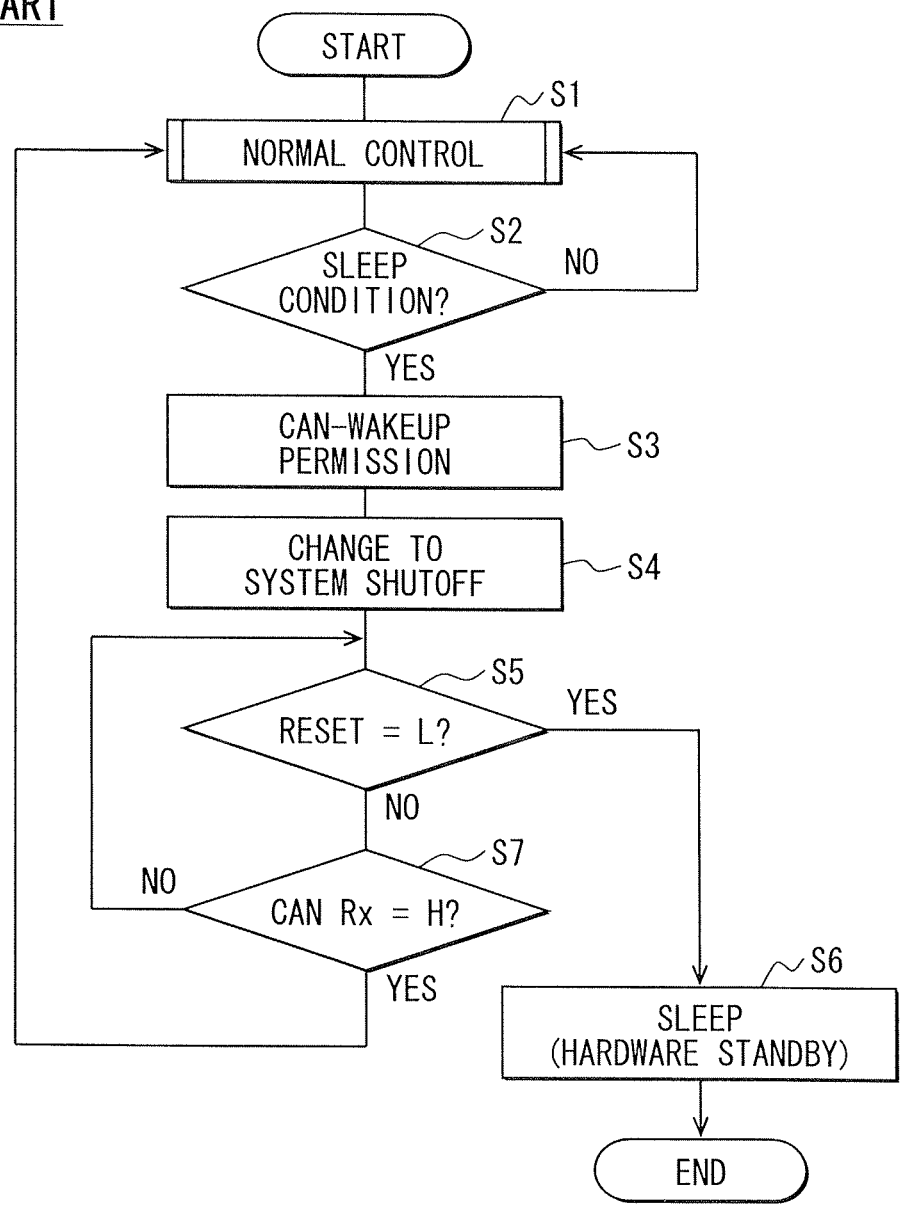

US 8,713,343 B2

ELECTRONIC CONTROL APPARATUS

CROSS REFERENCE TO RELATED APPLICATION

This application is based on and incorporates herein by reference Japanese patent applications No. 2010-193824 filed on Aug. 31, 2010 and No. 2011-12906 filed on Jan. 25, 2011.

FIELD OF THE INVENTION

The present invention relates to an electronic control apparatus, which includes an electronic control circuit for electronically controlling a control object device and a power circuit for generating electric power supplied to the control circuit.

BACKGROUND OF THE INVENTION

Patent document 1 discloses a vehicular control apparatus, which includes a microcomputer (electronic control circuit) for in-vehicle communication and a power IC for supplying electric power to the microcomputer.

According to patent document 1, as shown by a flowchart in FIG. 11, when a sleep condition is satisfied (step S2: YES) by, for example, turn-off of an ignition switch of a vehicle, shutting off of a system (shutting off electric power supply to the microcomputer) from a normal control condition (step S1) is performed in the following manner.

In case that CAN, for example, is adopted as an in-vehicle LAN, the shutoff processing is executed (step S4) after completing preparation (CAN-Wakeup permission, step S3) so that the microcomputer may wake up when a dominant signal is transmitted to a communication bus and communication is started responsively. When the power IC shuts off a power voltage VOM supplied to the microcomputer, the power voltage VOM falls. When the microcomputer is reset (low-active) (step S5: YES), the microcomputer changes its state to a sleep state (step S6) and stops its operation.

(Patent document 1) JP 4032955 corresponding to US 2004/0122565

However, according the shutoff sequence in patent document 1, the microcomputer repeats an infinite loop of step S5 after outputting a shutoff command to the power IC. Thus the microcomputer waits for being reset. When any one of masters transmits a dominant signal to the communication bus for the in-vehicle communication as shown in FIG. 8 (refer to (c)) under this condition, the system starts the wake-up sequence. The power voltage VOM supplied by the power IC rises again (refer to (a)), but the microcomputer remains in the same condition (refer to (d)), in which the microcomputer repeats the infinite loop and waits for being reset. That is, the microcomputer remains deadlocked in the reset wait state, waiting for the reset signal being changed to low.

In case of an electronic control unit (ECU) for controlling a gear transmission of the vehicle, for example, a specification is provided such that a gear position in the transmission at that time is displayed on an instrument panel in the vehicle when a door of the vehicle opens or a driver seats on a driver's seat. According to this specification, the dominant signal is transmitted to a communication bus when the driver opens the door to get out of the vehicle after turning off an ignition switch. As a result, the deadlock state arises. To counter this problem, as shown in FIG. 13 for example, it is proposed to monitor whether a dominant signal (CAN Rx=H) is transmitted to the communication bus (step S7) during a period, in which the microcomputer waits for being reset at step S5 (NO).

However, a threshold value (for example, about 2V) provided so that a communication driver IC operable with CAN may detect the dominant signal differs from a high level threshold value (for example 3.5V) provided so that the microcomputer may recognize a Rx signal, which is an output signal of a communication driver IC. It is thus likely that the wakeup sequence is not performed normally because of difference in detection timing of the dominant signal and the Rx signal. In addition, each detection is performed in a period, in which the power voltage supplied to the microcomputer fluctuates, the difference in detection timing becomes greater. As a result, it is likely that the detection and recognition become different between the dominant signal and the Rx signal.

SUMMARY OF THE INVENTION

It is an object of the present invention to provide an electronic control apparatus, which protects a control circuit from being deadlocked in performing shutoff processing.

According to the present invention, an electronic control apparatus comprises a control circuit for controlling a control object device, a communication driver for transforming signals applied thereto for communication between the control circuit and an external apparatus through a communication bus, a check circuit for checking whether the communication has started through the communication bus, a latch circuit for latching a communication start signal outputted from the check circuit, a power circuit for generating a power voltage, which is supplied to the control circuit in accordance with a control signal outputted from the control circuit or the communication start signal applied through the latch circuit, and a low voltage detection circuit for detecting fall of the power voltage below a predetermined threshold level.

In one aspect, the control circuit is reset and the check circuit is permitted to output the communication start signal, by the low voltage detection signal outputted from the low voltage detection circuit.

In another aspect, the control circuit changes the control signal applied to the power circuit to be inactive when a condition for changing from a normal operation mode to a sleep mode is satisfied under a condition that a power-on start signal is applied, then is reset by the low voltage detection signal of the low voltage detection circuit to remain in a wait state until proceeding to the sleep mode, and proceeds to the normal operation mode when the power-on start signal is changed to be active in a period of the wait state.

BRIEF DESCRIPTION OF THE DRAWINGS

The above and other objects, features and advantages of the present invention will become more apparent from the following detailed description made with reference to the accompanying drawings. In the drawings:

FIG. 13 is a flowchart showing processing of a microcomputer according to a prior art (part 2).

DETAILED DESCRIPTION OF THE PREFERRED EMBODIMENT

First Embodiment

Figure 1:
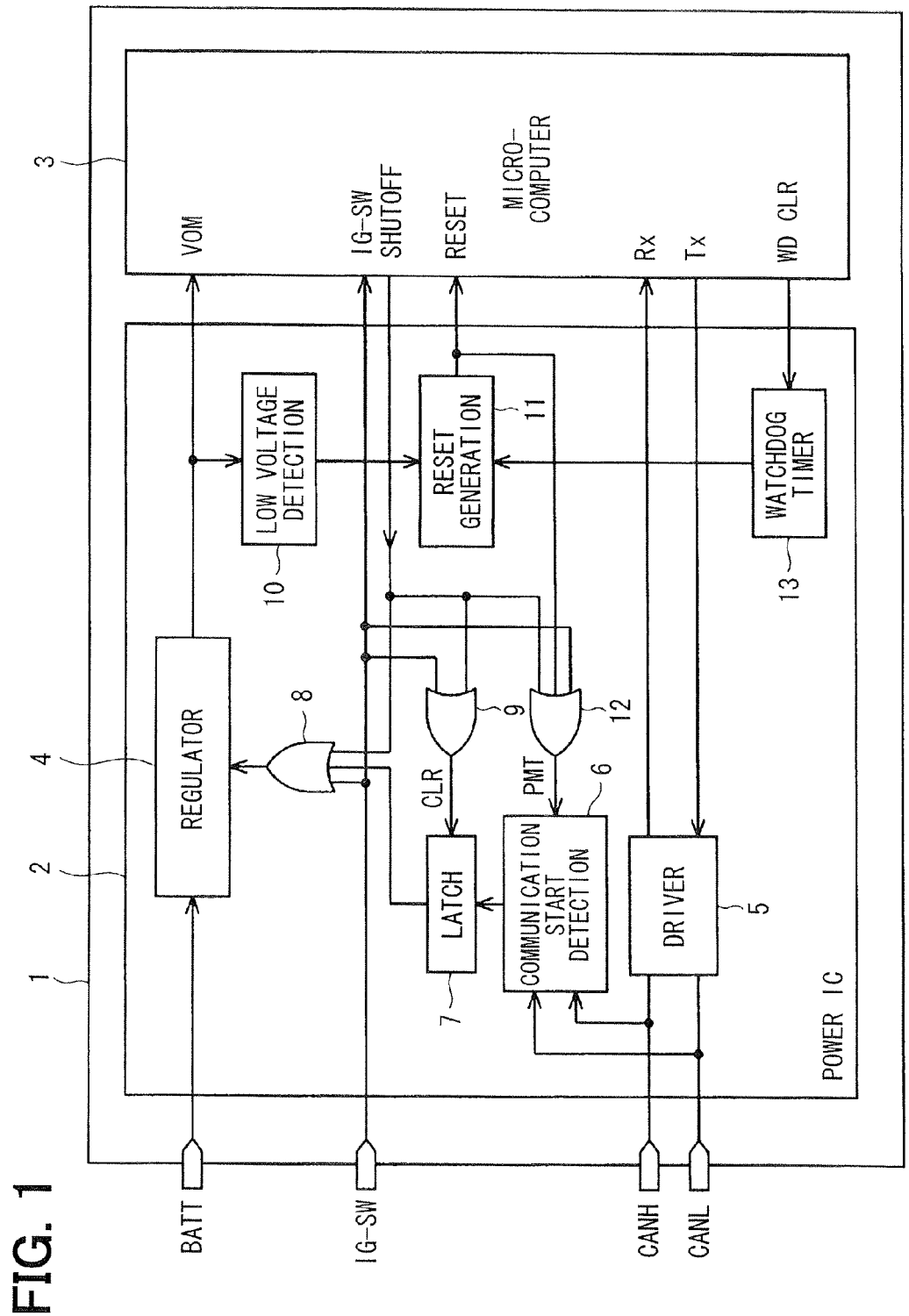
FIG. 1 is a functional block diagram showing an electronic control apparatus according to a first embodiment of the present invention.
Figure 2:
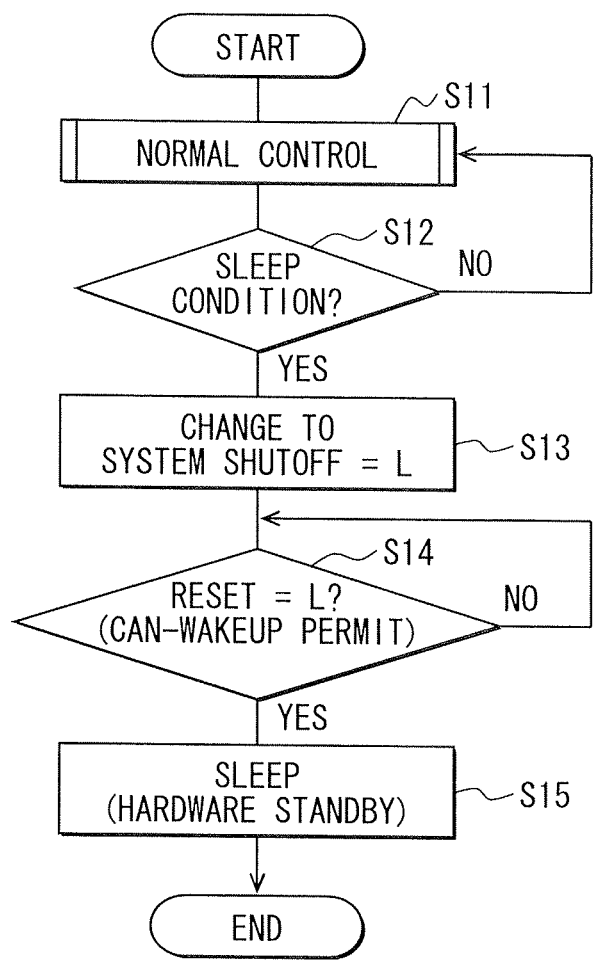
FIG. 2 is a flow chart showing processing of a microcomputer in the first embodiment.

A first embodiment will be described below with reference to FIG. 1 to FIG. 5. FIG. 1 is a functional block diagram showing an electronic control apparatus, which is configured as an electronic control unit (ECU) mounted in a vehicle, for example.

The electronic control apparatus 1 includes a power IC 2 and a microcomputer (electronic control circuit) 3. The power IC 2 includes a regulator (power voltage supply circuit) 4, to which a battery voltage BATT (for example, 12V) of a vehicle is supplied. The regulator 4 generates a power voltage VOM (for example, 5V), which is supplied to the microcomputer 3 by stepping down the battery voltage BATT.

The power IC 2 further includes a communication driver (and receiver) 5, which is operable with CAN (controlled area network), for example and connected to communication bus lines CANH and CANL. When the communication driver 5 receives a differential signal from other nodes such as an external apparatus (ECU) through the communication bus lines, the communication driver 5 transforms and transmits received data Rx to the microcomputer 3. When the microcomputer 3 outputs transmission data Tx to the communication driver 5, the communication driver 5 transforms and outputs a differential signal (dominant, recessive) to the communication bus lines CANH and CANL in accordance with the transmission data Tx. The buses CANH and CANL are connected to a communication start detection circuit (check circuit) 6. When the communication start detection circuit 6 detects that the dominant signal is outputted to the bus lines CANH and CANL, the communication start detection circuit 6 outputs a communication start signal to the regulator 4 through a latch circuit 7 and an OR gate 8.

The latch circuit 7 changes its output signal to a high level at time of rise of the communication start signal, for example, and maintains its signal level condition. The OR gate 8, which has three inputs, further receives an ignition signal IG-SW of an ignition switch (not shown) of a vehicle and a system shutoff signal (low-active) outputted by the microcomputer 3. The ignition signal IG-SW and the system shutoff signal are applied to input terminals of an OR gate 9 and an OR-ed signal of these signals is applied to as a latch signal for the latch circuit 7. The ignition signal IG-SW is also applied to an input terminal of the microcomputer 3.

When the signal applied from the OR gate 8 is at the high level, the regulator 4 operates and supplies the power voltage VOM to the microcomputer 3. When the ignition signal IG-SW is changed to the low level, the regulator 4 stops its operation and reduces the power voltage VOM to 0V. A low voltage detection circuit (voltage drop detection circuit) 10 is connected to an output terminal (power supply line for power voltage VOM) of the regulator 4. When the power voltage VOM falls below a predetermined threshold value Vth (for example, 4.5V), the low voltage detection circuit 10 outputs a low voltage detection signal to a reset signal generation circuit 11 thereby to indicate fall of the power voltage VOM.

The reset signal generation circuit 11 outputs the reset signal (low-active) to the microcomputer 3 in response to the low voltage detection signal. The reset signal, the ignition switch signal IG-SW and the system shutoff signal are applied to the input terminals of the three-input OR gate 12. An OR-ed signal of these signals is applied as an output permission signal for the communication start detection circuit 6. The communication start detection circuit 6 outputs the communication start signal to the latch circuit 7 when the signal applied through the OR gate 12 is at the high level. The power IC 2 includes a watchdog timer 13. When a clear signal is not applied from the microcomputer 3 for a predetermined period, the watchdog timer 13 overflows and outputs an overflow signal to the reset signal generation circuit 11 thereby to reset the microcomputer 3.

The operation of the first embodiment will be described with further reference to FIG. 2 to FIG. 5.

The microcomputer 3 performs normal control at step S11 and check step at S12, in a similar manner as at steps S1 and S2, until a sleep condition is satisfied, for example, until the ignition signal IG-SW changes to OFF (low level) in a normal control condition. When the sleep condition is satisfied (step S12: YES), the microcomputer 3 changes the level of the system shutoff signal from a high level (H) to a low level (L) (step S13) and proceeds to a reset wait condition (step S14).

Thereafter, the reset signal of the microcomputer 3 becomes active due to operation of the hardware side described later and the level of the power voltage VOM supplied from the regulator 4 falls. The power IC 2 thus takes the standby condition (step S15). While the microcomputer 3 is in the reset wait condition, it continues to output a watchdog clear signal WDCLR for the watchdog timer 13 and hence the watchdog timer 13 does not overflow.

Figure 3:
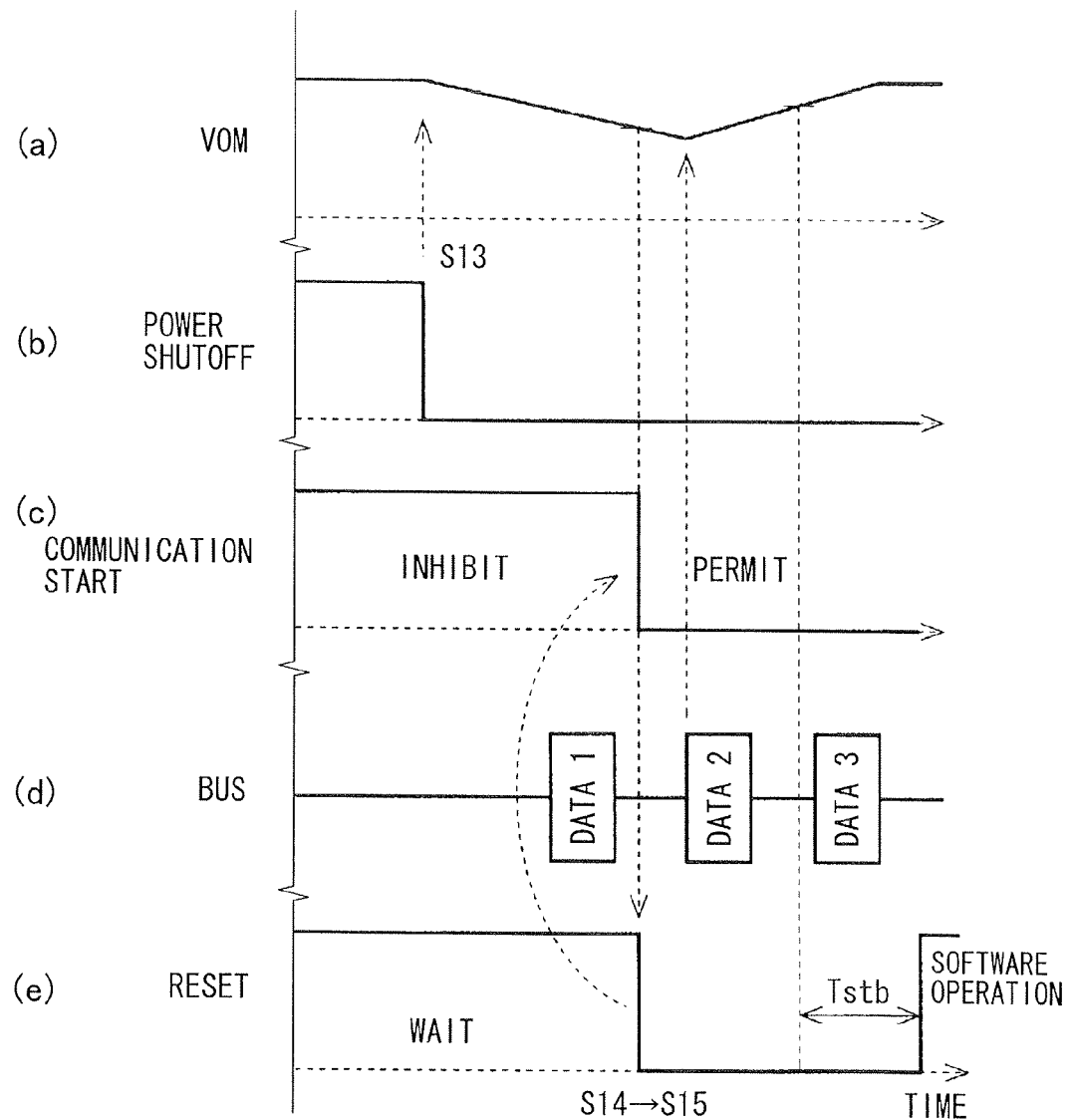
FIG. 3 is a time chart showing a case, in which an ignition signal IG-SW indicates OFF in the first embodiment.
Figure 12:
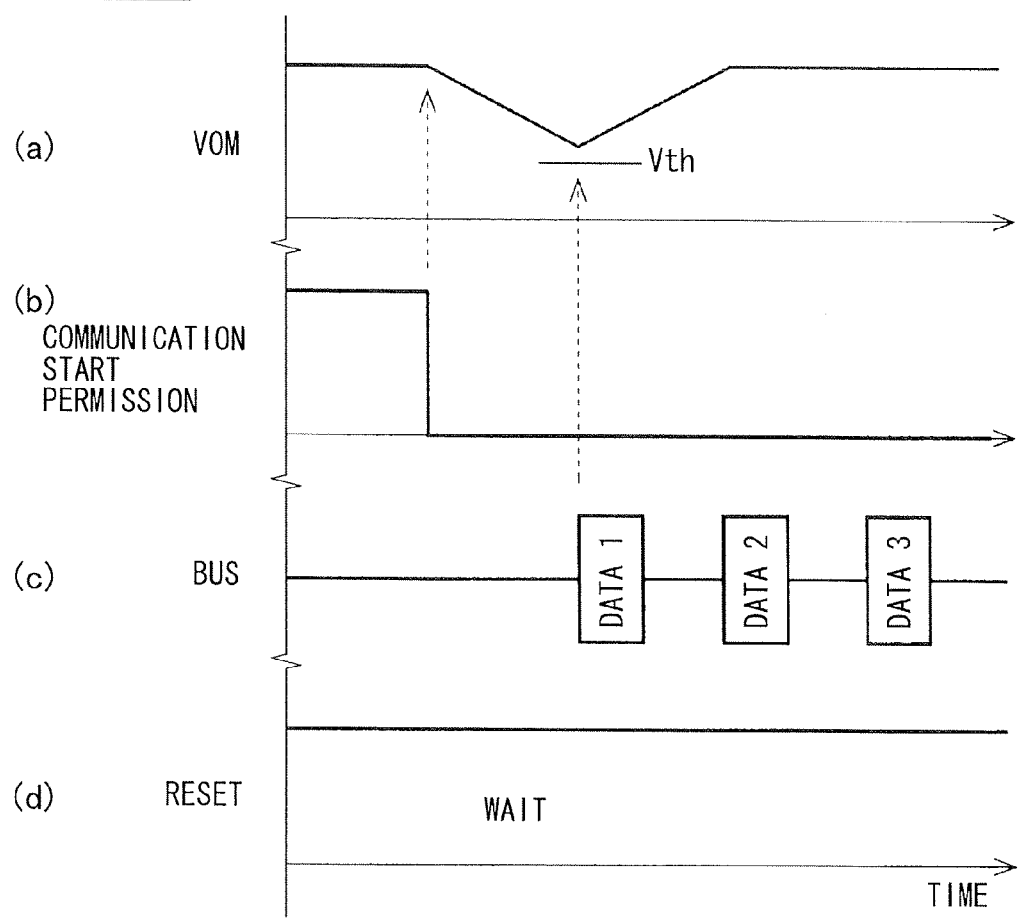
FIG. 12 is a time chart showing a case, in which an ignition signal IG-SW indicates OFF in the prior art.

As shown in FIG. 3, which corresponds to FIG. 12, when the level of the power voltage VOM (a) falls and the low voltage detection circuit 10 outputs the low voltage detection signal to the reset signal generation circuit 11, the reset signal generation circuit 11 outputs the reset signal (e) to the microcomputer 3 in response to the detection signal. Data DATA1 is outputted onto the communication bus as indicated by (d) before the microcomputer 3 is reset. However, since the microcomputer 3 is in the reset wait condition at step S14 at this moment, the data DATA1 is not received.

At the same time as the reset signal is outputted to the microcomputer 3, the communication start detection circuit 6 is permitted to output the communication start permission signal (c). That is, when the microcomputer 3 determines YES at step S14 in FIG. 2, CAN-wakeup is permitted again. When data DATA2 is outputted onto the communication bus, the communication start detection circuit 6 outputs the communication start permission signal. This signal is applied to the regulator 4 through the latch circuit 7 and the OR gate 8. The regulator 4 responsively start its operation again. The level of the power voltage VOM rises and exceeds a predetermined level, so that a built-in oscillation circuit of the microcomputer 3 starts its operation. After an elapse of time Tstb, in which the oscillation is stabilized, the microcomputer 3 is released from the reset condition (e). In this instance, the microcomputer 3 misses retrieving data DATA1 to DATA3. However, the microcomputer 3 is released from the deadlock condition, in which the reset wait condition continues.

Figure 4:
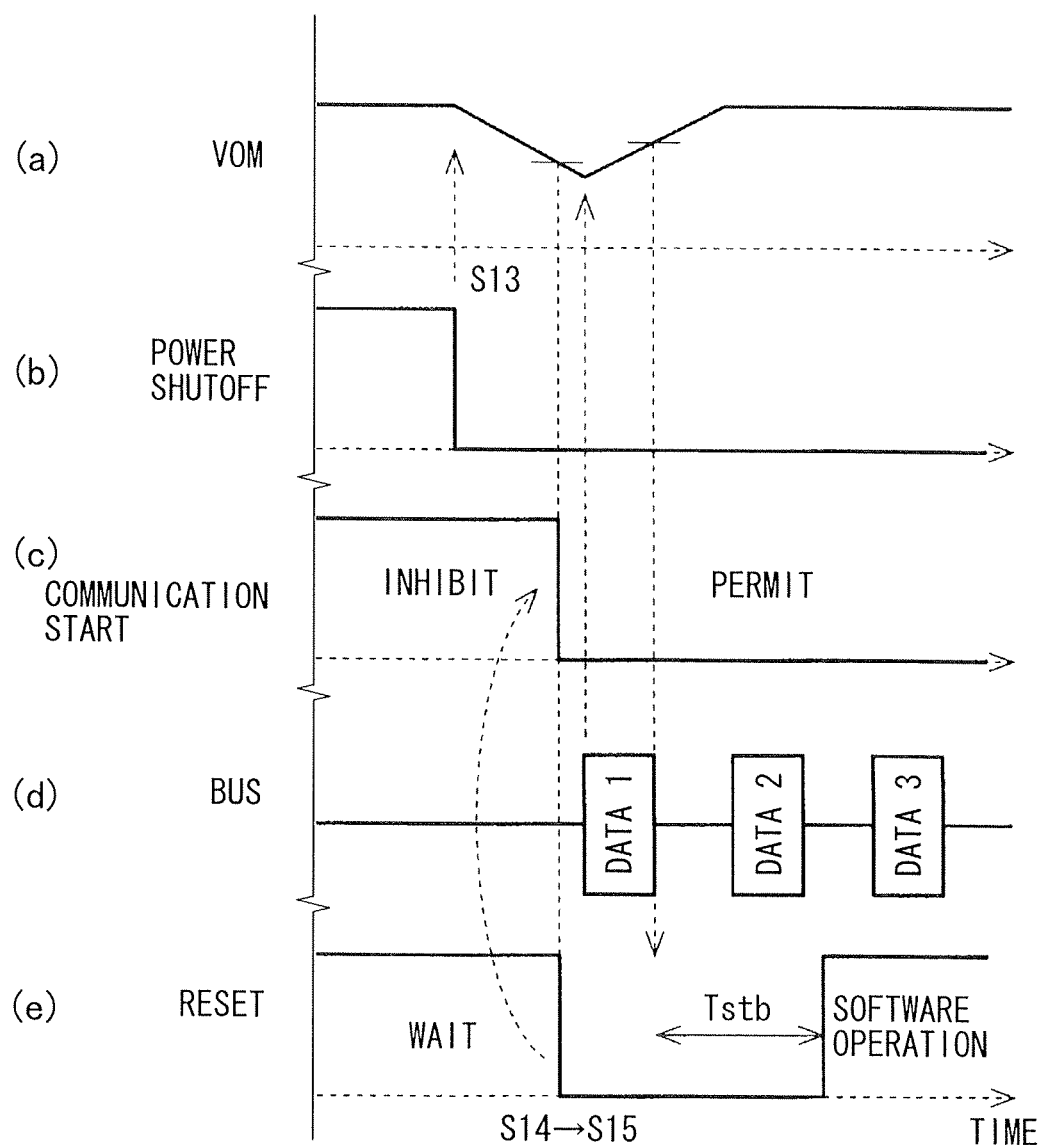
FIG. 4 is a time chart showing another case, in which the ignition signal IG-SW indicates OFF in the first embodiment.

In another case shown in FIG. 4, it is assumed that the data DATA1 is outputted onto the communication bus as indicated by (d) after the microcomputer 3 is reset (e) and the communication start detection circuit 6 is permitted to output the communication start permission signal (c). Since the communication start detection circuit 6 outputs the communication start detection signal and the regulator 4 starts its operation again when the data DATA1 is outputted, the level of the power voltage VOM (a) starts to rise at a time point earlier then that in FIG. 3. The microcomputer 3 thus misses retrieving the data DATA1 and DATA2. However, this is the same as in the prior art.

Figure 5:
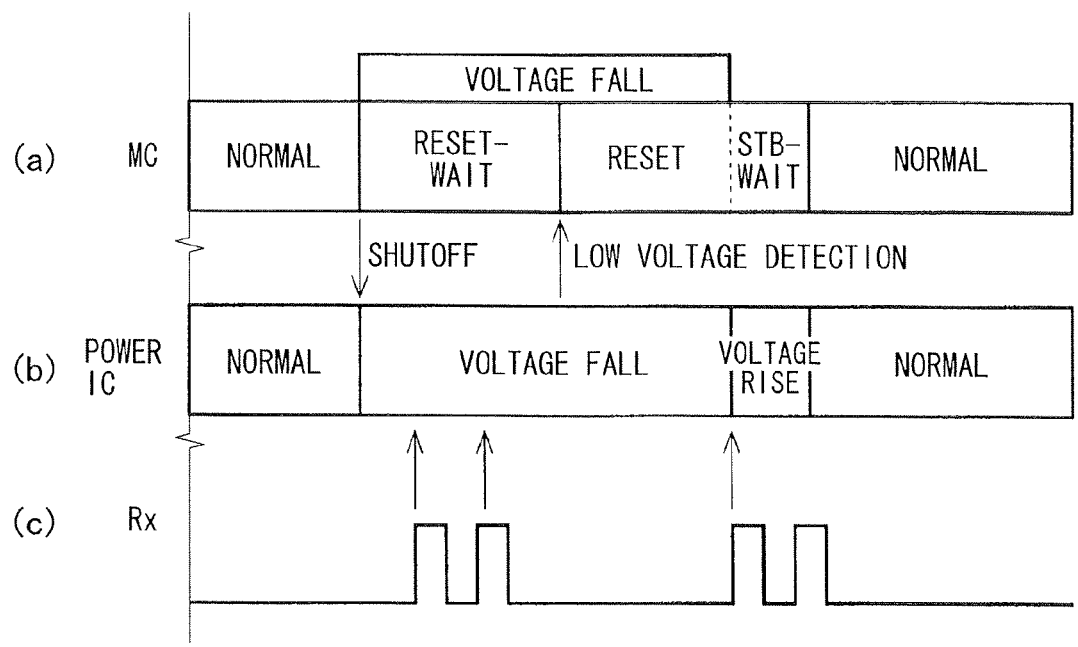
FIG. 5 is a time chart showing operation states of the microcomputer in the first embodiment.

FIG. 5 shows states of the microcomputer 3 in (a), transition of operation condition of the power IC 2 (regulator 4) in (b), and output timing of received data Rx (dominant signal) in (c). Even if the received data Rx is outputted while the microcomputer 3 is outputting the system shutoff signal and in the reset-wait condition, the microcomputer 3 does not accept such data and the regulator 4 is not activated either until the microcomputer 3 is reset. If the received data Rx is outputted while the microcomputer 3 is reset, the communication start detection circuit 6 outputs the communication start signal and the regulator 4 starts its operation again. The level of the power voltage VOM starts to rise.

As described above, according to the first embodiment, the electronic control apparatus 1 is configured such that, when the power voltage VOM supplied from the regulator 4 starts to fall to thereby stop operation of the microcomputer 3 and the low voltage detection circuit 10 detects this voltage fall, the microcomputer 3 is reset immediately and the communication start detection circuit 6 is permitted to output the communication start signal. Thus, differently from the prior art, the microcomputer 3 is protected from persistently staying in the reset-wait condition and being deadlocked, even when the power voltage starts to rise again as a result of the start of communication after the power voltage started to fall. When the reset is released due to rise of the power voltage, the microcomputer 3 is enabled to receive data outputted onto the communication bus thereafter. It is thus possible to control the control object device based on the received data.

Further, the power IC 2 is provided with the regulator 4, the communication driver 5, the communication start detection circuit 6 and the latch circuit 7 on a same chip (semiconductor substrate). As a result, connection terminals among chips can be reduced in number. The communication start signal can be outputted to the regulator 4 without delay and series of control can be performed quickly.

Second Embodiment

Figure 6:
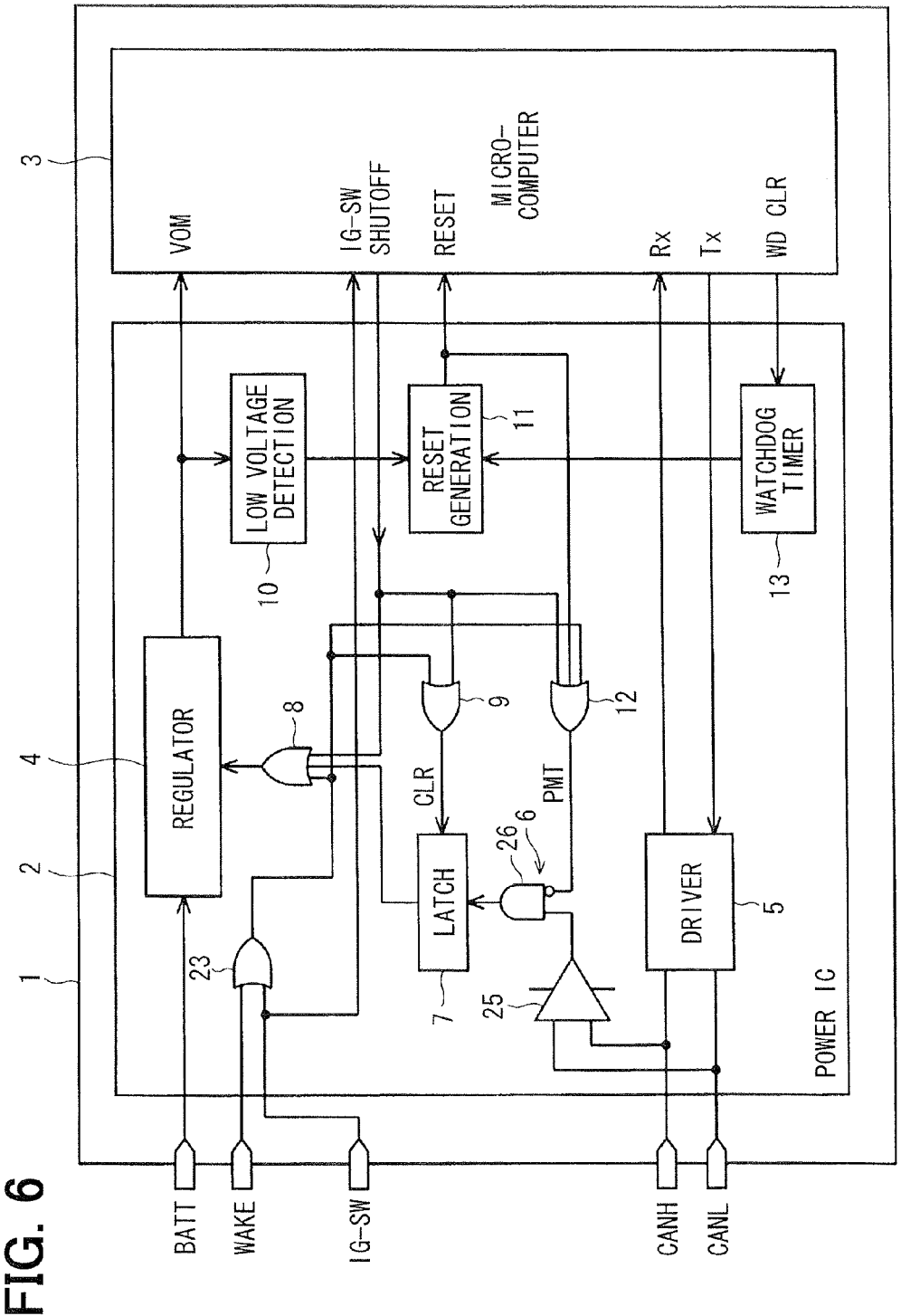
FIG. 6 is a functional block diagram showing an electronic control apparatus according to a second embodiment of the present invention.

A second embodiment is a modification of the first embodiment and shown in FIG. 6. The same parts as the first embodiment are designated by the same reference numerals, so that the same description need not be repeated.

In the electronic control apparatus 1 shown in FIG. 6, the power IC 2 is different from that in the first embodiment. A wakeup signal WAKE (high-active), which is generated by an external ECU for the microcomputer 3, is applied to the electronic control apparatus 1. The wake signal is applied to each of the OR gates 8, 9 and 12 together with the ignition signal IG-SW through an OR gate 23. The external ECU, which outputs the WAKE signal, may be a seat ECU or a door ECU as described before in case that the electronic control apparatus 1 is, for example, an ECU for the transmission.

The communication start detection circuit (check circuit) 6 is formed of a differential amplifier circuit 25 and an AND gate 26 (signal output inhibition part). The differential amplifier circuit 25 detects a differential signal between the communication bus lines CANH and CANL. The AND gate 26 outputs the output signal of the differential amplifier circuit 25 to the latch circuit 7. When the dominant signal is outputted onto the communication bus lines CANH and CANL, the differential amplifier circuit 25 outputs a high level signal in accordance with a potential difference between the bus lines. One output terminal of the OR gate 12 is connected to an input terminal (inverted logic) of the AND gate 26.

The operation of the second embodiment will be described next. When the WAKE signal is outputted from the external side, the regulator 4 is activated through the OR gates 23 and 8 in the similar manner as in the case that the ignition signal IG-SW indicates ON. The power voltage VOM rises and is applied to the microcomputer 3, which responsively start its operation (wakeup). The high level signal outputted by the OR gate 23 is also applied to the OR gates 9 and 12 to clear the latch circuit 7. The signal level at the inverted logic of the AND gate 26 becomes high. As a result, even when the differential amplifier circuit 25 of the communication start detection circuit 6 detects that the dominant signal is outputted onto the communication bus lines CANH and CANL, the communication start signal for the latch circuit 7 is inhibited by the AND gate 26. The foregoing operation is the same as in the case that the ignition signal IG-SW is changed to the high level.

As described above, in the electronic control apparatus 1 according to the second embodiment, the regulator 4 starts to supply the power voltage VOM to the microcomputer 3, when the wakeup signal WAKE for the microcomputer 3 applied from the external side becomes active or the ignition switch signal IG-SW indicates ON. The AND gate 26 inhibits the communication start detection circuit 24 from outputting the communication start signal. That is, in this case, since the microcomputer 3 starts to operate when the wakeup signal becomes active or the ignition signal IG-SW indicates ON, the communication start detection circuit 6 is inhibited from outputting unnecessary signals.

Third Embodiment

Figure 7:
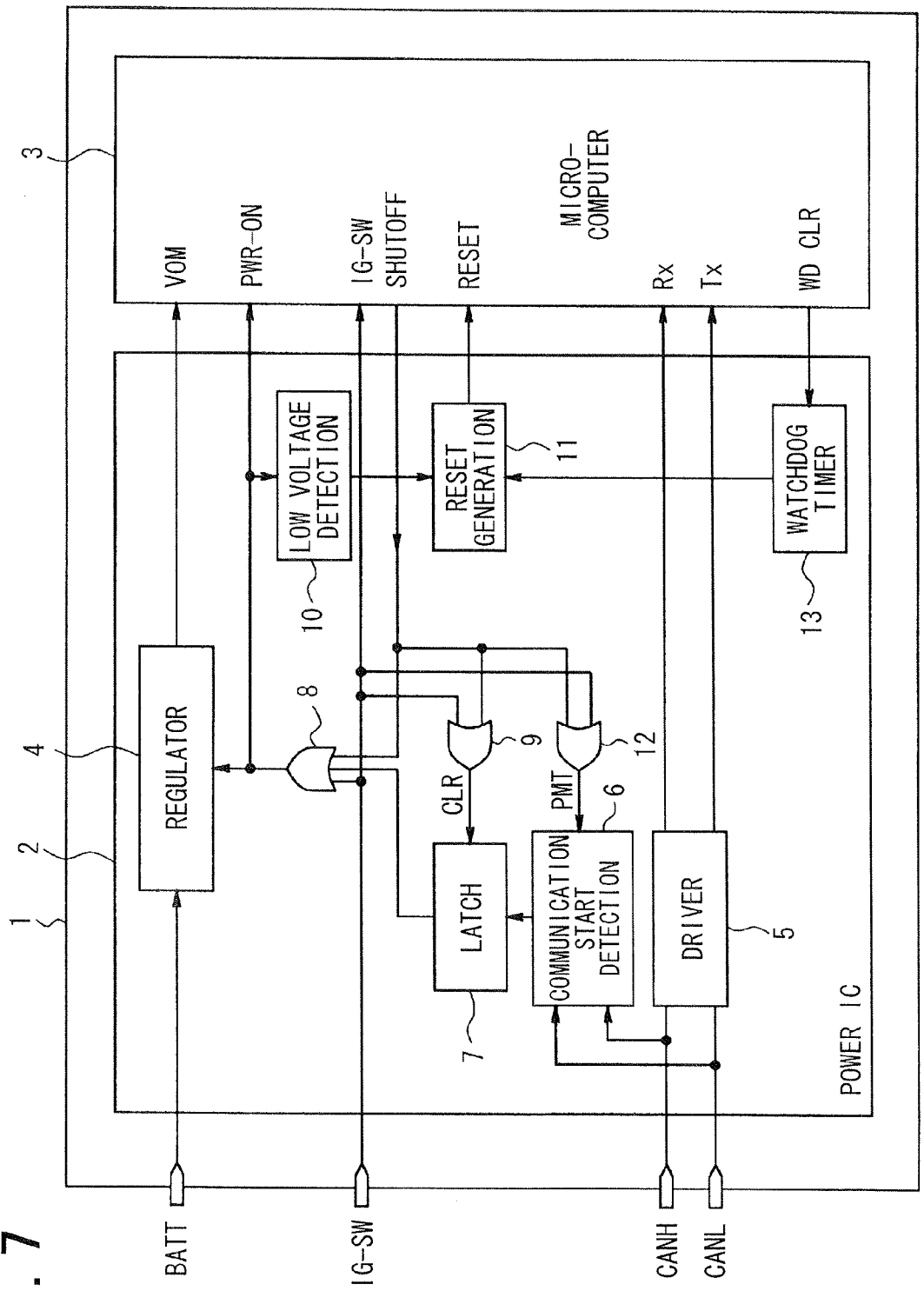
FIG. 7 is a functional block diagram showing an electronic control apparatus according to a third embodiment of the present invention.

A third embodiment is a modification of the first embodiment and shown in FIG. 7. The same parts as the first embodiment are designated by the same reference numerals, so that the same description may not be repeated.

In the third embodiment, the communication start detection circuit 6 outputs the communication start signal, as a power-on permission signal (power supply start signal) PWR-ON (high active), to the regulator 4 through the latch circuit 7 and the OR gate 8, upon detection of the dominant signal on the communication bus lines CANH and CANL. The power-on permission signal PWR-ON is applied to the microcomputer 3 as well. That is, the regulator 4, the communication driver 5, the communication start detection circuit 6 and the latch circuit 7 are mounted on a single chip (semiconductor substrate) of the power IC 2.

The latch circuit 7 changes its output signal to the high level, for example, at time of rise of the communication start signal, and maintains its state. In addition, the ignition signal IG-SW of the ignition switch of the vehicle and the system shutoff signal (low active, control signal) outputted from the microcomputer 3 are applied to the three-input OR gate 8. The ignition signal IG-SW and the system shutoff signal are also applied to the input terminal of the OR gate 9 and an OR-ed signal of these signal is applied as the clear signal of the latch circuit 7. The ignition signal IG-SW is also applied to the input terminal of the microcomputer 3.

The reset signal generation circuit 11 outputs a reset signal (low active) to the microcomputer 3 in response to the low voltage detection signal. The ignition switch signal IG-SW and the system shutoff signal are applied to the input terminals of the OR gate 12. The OR-ed signal of these signals is applied as the output permission signal of the communication start detection signal. The communication start detection circuit 6 outputs the communication start signal to the latch circuit 7 in case that the signal applied through the OR gate 12 is at the low level.

Figure 8:
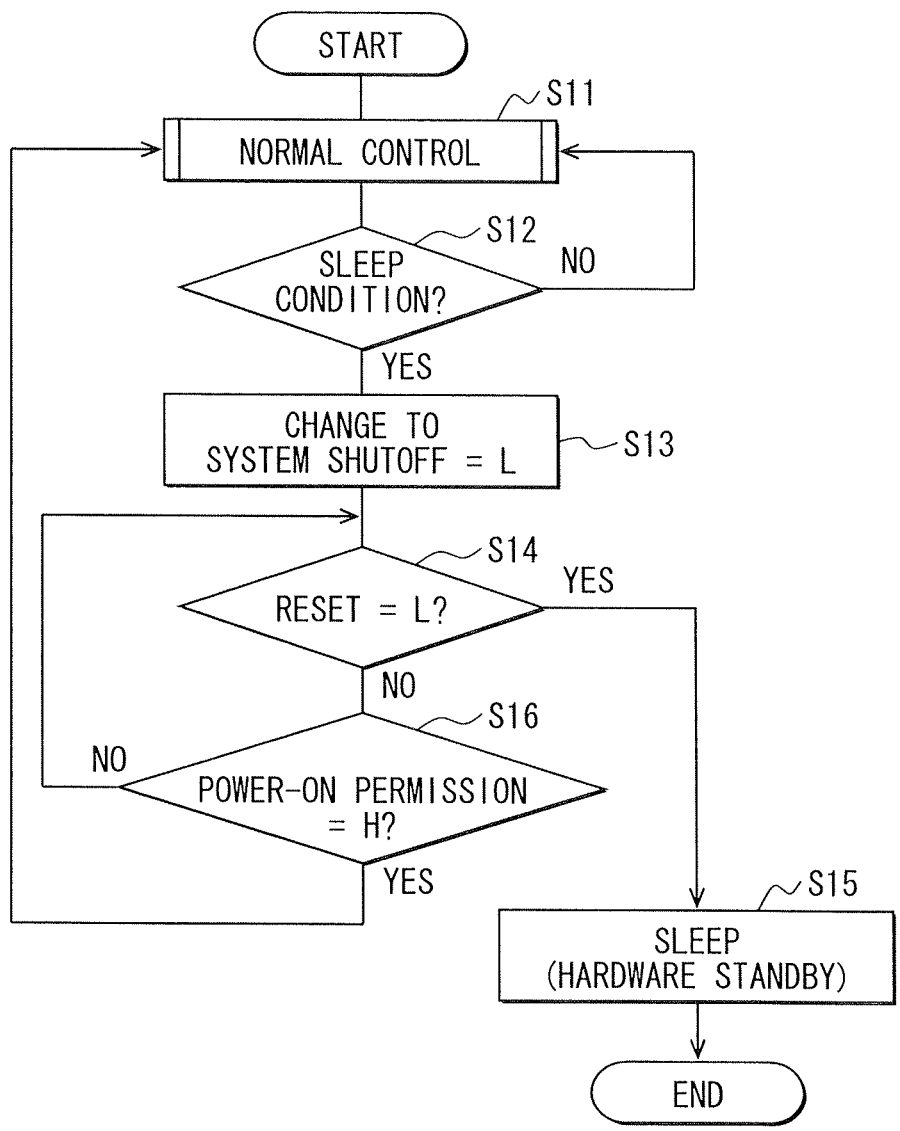
FIG. 8 is a flow chart showing processing of the microcomputer in the third embodiment.

The operation of the third embodiment will be described with further reference to FIGS. 8 and 9. Check step S16 is provided to check whether the power-on permission signal is high. That is, the microcomputer 3 checks at step S16 whether the power-on permission signal PWR-ON became active (high level H) while no reset is made at step S14 (NO). The microcomputer 3 performs step S11 when the power-on permission signal PWR-ON become active (YES). If the power-on permission signal PWR-ON is not active (NO), step S14 is repeated until resetting is made.

When the sleep condition is satisfied at step S12 (YES) due to, for example, the ignition signal IG-SW indicating OFF (low level), the microcomputer 3 changes the level of the system shutoff signal from high (H) to low (L) at step S13 and proceeds to the reset-wait state (step S14). At this time, the output signal of the OR gate 12 becomes the low level, activation of the microcomputer 3 is permitted by start of communication. While the microcomputer 3 is in the reset-wait condition, the microcomputer 3 persistently outputs the clear signal to the watchdog timer 13, the watchdog timer 13 does not overflow.

Figure 9:
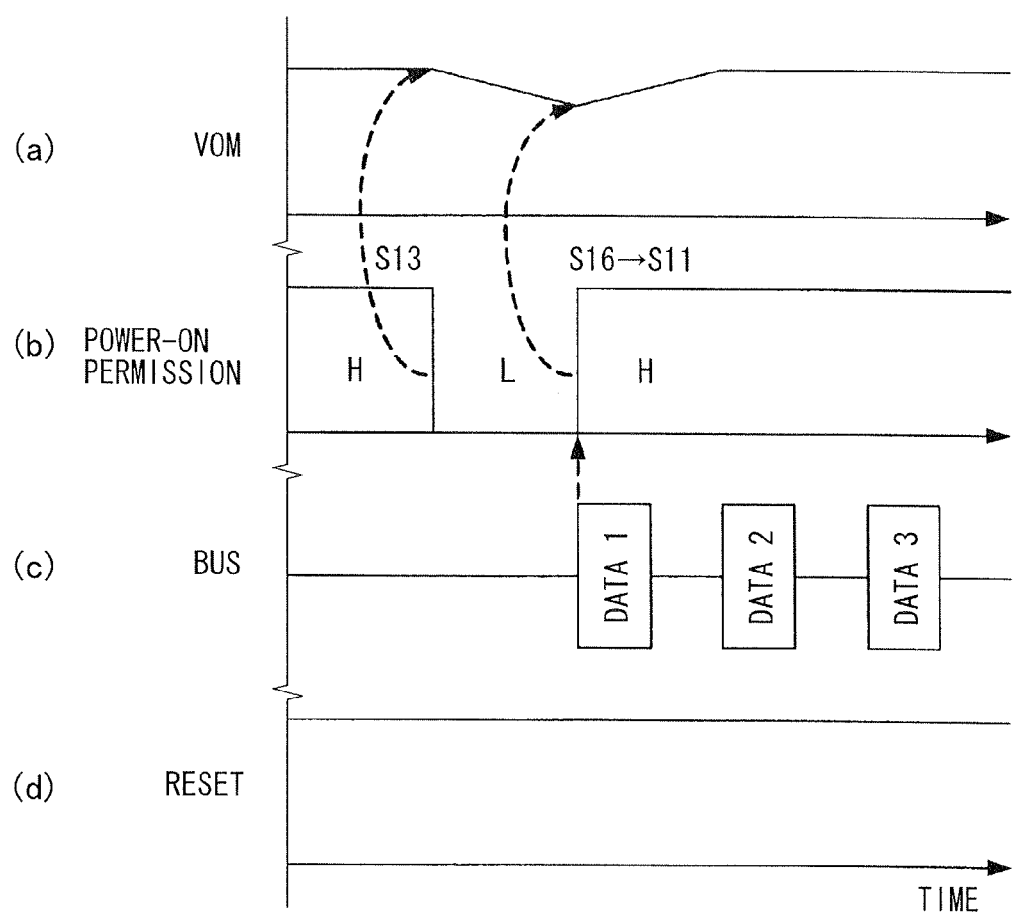
FIG. 9 is a time chart showing a case, in which the ignition signal IG-SW indicates OFF in the third embodiment.

As shown in FIG. 9, the power-on permission signal PWR-ON (b) becomes active and the level of the power voltage VOM (a) supplied from the regulator 4 starts to fall, when the microcomputer 3 changes the level of the system shutoff signal to the low level at step S13. When the low voltage detection circuit 10 outputs the low voltage detection signal, the DATA1 is outputted onto the communication bus as indicated by (c) before the reset signal generation circuit 11 outputs the reset signal to the microcomputer 3. Thus, the communication start permission signal is outputted and the power-on permission signal PWR-ON becomes active as indicated by (b).

The regulator 4 restarts it operation and the level of the power voltage VOM rises again. The microcomputer 3 determines YES at step S16 when the power-on permission signal PWR-ON became active. The microcomputer 3 proceeds to the normal control operation as indicated by (b) and is enabled to receive the DATA1. As a result, as opposed to the prior art, the microcomputer 3 is protected from being deadlocked in the reset wait condition.

As described above, in the electronic control apparatus 1 according to the third embodiment, the power-on permission signal PWR-ON, which is applied to the regulator 4, is also applied to the microcomputer 3. When the microcomputer 3 determines that the condition for changing from the normal operation mode to the sleep mode, the microcomputer 3 changes the system shutoff signal to the low level and changes the power-on permission signal PWR-ON to be inactive. The microcomputer 3 remains in the wait state until it is reset by the low voltage detection signal and proceeds to the sleep mode.

When other devices connected to the microcomputer 3 through the communication bus lines CANH and CANL start communication by outputting respective signals onto the bus lines, the power-on permission signal PWR-ON responsively becomes active. The regulator 4 thus restarts the power supply to the microcomputer 3. The microcomputer 3 recognizes the change of the power-on permission signal PWR-ON to the active level. The microcomputer 3 thus changes its state from the wait condition and proceeds to the normal operation mode. As described above, as opposed to the prior art, the microcomputer 3 is protected from being deadlocked in waiting for being reset, when the power voltage VOM rises again as a result of start of communication after supply of the power voltage has been stopped and the power voltage has started to fall.

Fourth Embodiment

Figure 10:
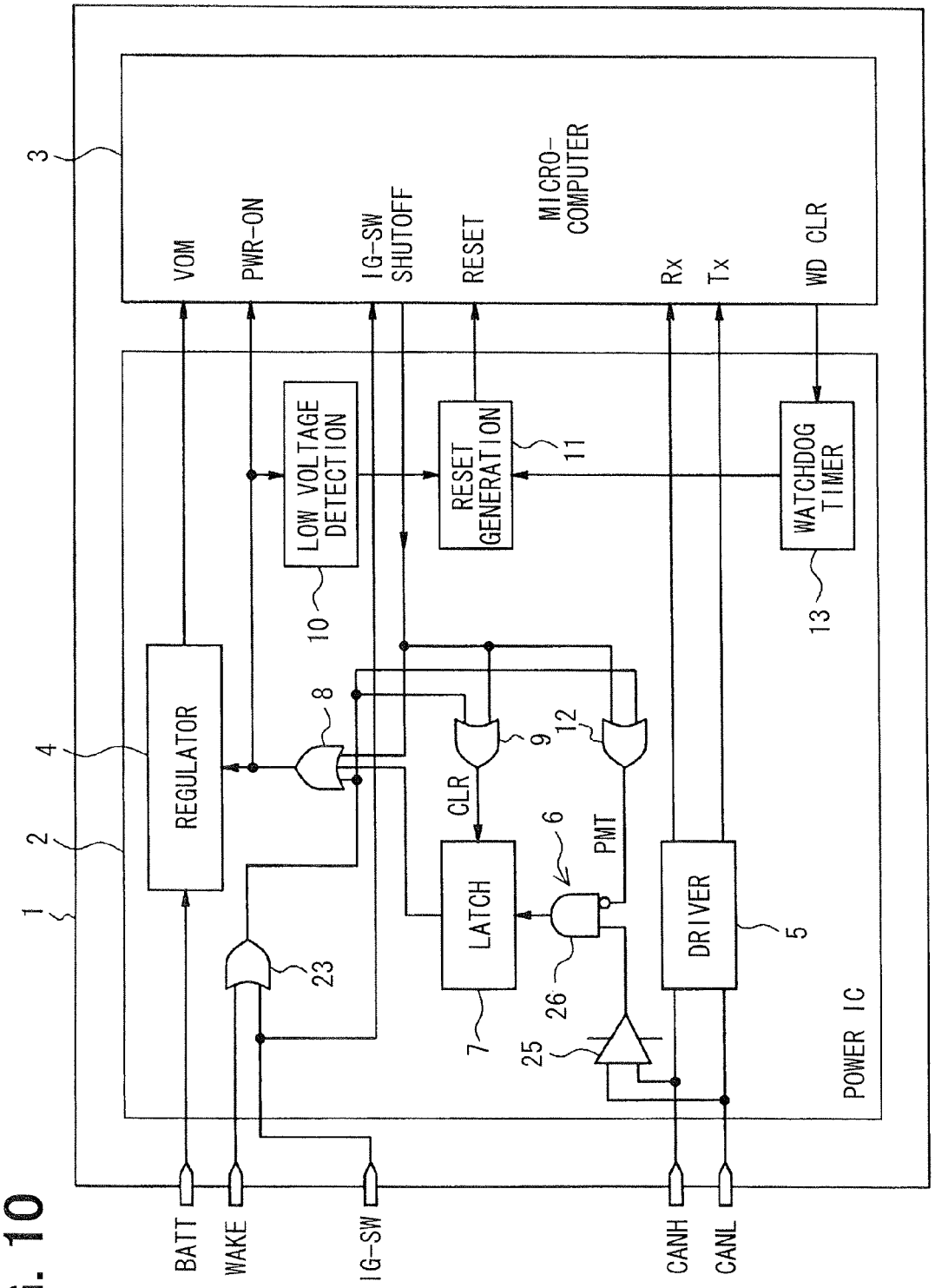
FIG. 10 is a functional block diagram showing an electronic control apparatus according to a fourth embodiment of the present invention.
Figure 11:
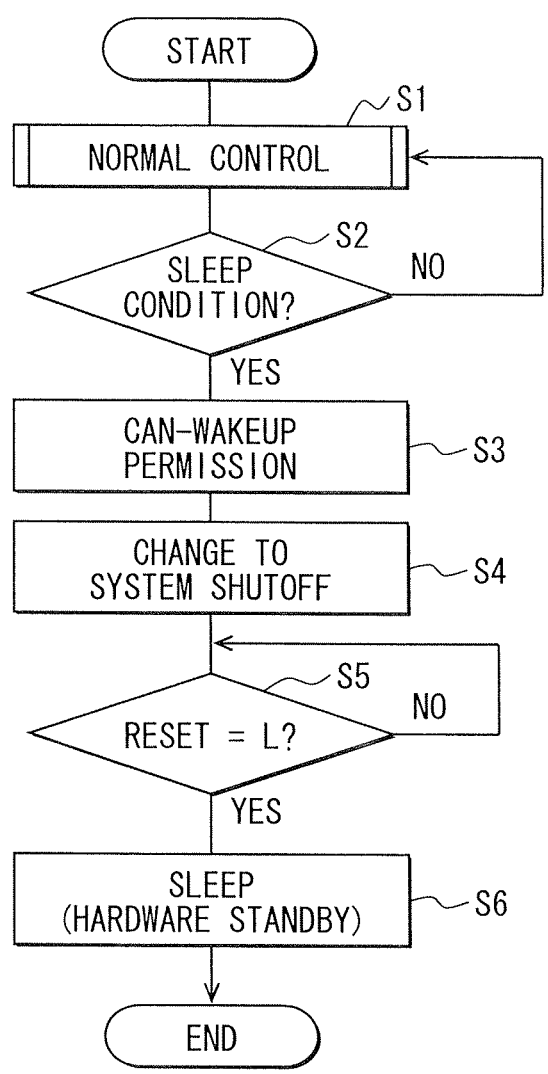
FIG. 11 is a flowchart showing processing of a microcomputer according to a prior art (part 1)

A fourth embodiment is a modification of the third embodiment and shown in FIG. 10. Specifically the fourth embodiment modifies the third embodiment by addition of the OR gate 23 in the similar manner as the second embodiment shown in FIG. 6 modifies the first embodiment shown in FIG. 1. Therefore, no more same description in respect of configuration, operation and advantage will be necessitated.

The present invention is not limited to the above-described embodiments. The following modification will be possible.

The power IC 2, the microcomputer 3 and associated circuits may be formed on different chips or on the same chip.

According to the second embodiment and the fourth embodiments, the signal applied to the electronic control apparatus 1 from the external side may be only one of the wakeup signal WAKE and the ignition switch signal IG-SW.

In case of resetting the microcomputer 3 when the watchdog timer 13 overflows, the communication start signal may be inhibited from being outputted as in the second embodiment and the fourth embodiment.

The watchdog time 13 may be provided only when necessary.

The in-vehicle communication is not limited to CAN but may be LIN, FlexRay® or the like.

The communication is not limited to the in-vehicle communication, because the control object is not limited to an in-vehicle device.

What is claimed is:
1. An electronic control apparatus comprising:
a control circuit for controlling a control object device;
a communication driver for transforming signals applied thereto for communication between the control circuit and an external apparatus through a communication bus;
a check circuit for checking whether the communication has started through the communication bus;
a latch circuit for latching a communication start signal outputted from the check circuit;
a power circuit for generating a power voltage, which is supplied to the control circuit in accordance with a control signal outputted from the control circuit or the communication start signal applied through the latch circuit; and
a low voltage detection circuit for detecting fall of the power voltage below a predetermined threshold level, wherein the control circuit is reset and the check circuit is permitted to output the communication start signal, by the low voltage detection signal outputted from the low voltage detection circuit.

2. The electronic control apparatus according to claim 1, wherein:
the power circuit starts to supply the power voltage to the control circuit, when a wakeup signal applied for the control circuit from an external side becomes active; and
the check circuit includes a signal output inhibiting part, which inhibits outputting of the communication start signal, when the wakeup signal becomes active.

3. The electronic control apparatus according to claim 1, wherein:
the power circuit starts to supply the power voltage to the control circuit, when a signal indicating ON or OFF of an ignition switch mounted in a vehicle becomes ON; and
the check circuit includes a signal output inhibition part, which inhibits outputting of the communication start signal, when the ignition switch signal becomes ON.

4. The electronic control apparatus according to claim 1, wherein:
the communication driver, the check circuit, the latch circuit and the power circuit are all formed on a same semiconductor substrate.

5. An electronic control apparatus comprising:
a control circuit for controlling a control object device;
a communication driver for transforming signals applied thereto for communication between the control circuit and an external apparatus through a communication bus;
a check circuit for checking whether the communication has started through the communication bus;
a latch circuit for latching a communication start signal outputted from the check circuit;
a power circuit for generating a power voltage, which is supplied to the control circuit when a power-on start signal becomes active, the power-on start signal becoming active when a control signal outputted from the control circuit becomes active or the communication start signal applied through the latch circuit becomes active; and
a low voltage detection circuit for detecting fall of the power voltage below a predetermined threshold level,
wherein the control circuit changes the control signal applied to the power circuit to be inactive when a condition for changing from a normal operation mode to a sleep mode is satisfied under a condition that a power-on start signal is applied, then is reset by the low voltage detection signal of the low voltage detection circuit to remain in a wait state until proceeding to the sleep mode, and proceeds to the normal operation mode when the power-on start signal is changed to be active in a period of the wait state.

6. The electronic control apparatus according to claim 5, wherein:
the control circuit is applied with a wakeup signal from an external side;
the power circuit starts supply of the power voltage to the control circuit when the wakeup signal becomes active; and
the check circuit includes a signal output inhibition part, which inhibits outputting of the communication start signal, when the wakeup signal become active.

7. The electronic control apparatus according to claim 5, wherein:
the control circuit is applied with an ignition signal indicating ON and OFF of an ignition switch mounted in a vehicle;
the power circuit starts supply of the power voltage to the control circuit when the ignition signal indicates ON of the ignition switch; and
the check circuit includes a signal output inhibition part, which inhibits outputting of the communication start signal, when the ignition switch signal indicates ON of the ignition switch.

8. The electronic control apparatus according to claim 5, wherein:
the communication driver, the check circuit, the latch circuit and the power circuit are all formed on a same semiconductor substrate.

* * * * *